(12) United States Patent
Liang et al.

(10) Patent No.: US 10,987,622 B2
(45) Date of Patent: Apr. 27, 2021

(54) ACID GAS SEPARATION MEMBRANE AND ACID GAS SEPARATION METHOD USING SAME, ACID GAS SEPARATION MODULE, AND ACID GAS SEPARATION APPARATUS

(71) Applicant: SUMITOMO CHEMICAL COMPANY, LIMITED, Tokyo (JP)

(72) Inventors: Cui Liang, Osaka (JP); Hironori Takemoto, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 129 days.

(21) Appl. No.: 16/090,613

(22) PCT Filed: Mar. 30, 2017

(86) PCT No.: PCT/JP2017/013211
§ 371 (c)(1),
(2) Date: Oct. 2, 2018

(87) PCT Pub. No.: WO2017/175656
PCT Pub. Date: Oct. 12, 2017

(65) Prior Publication Data
US 2019/0111382 A1 Apr. 18, 2019

(30) Foreign Application Priority Data
Apr. 4, 2016 (JP) .............................. JP2016-074913

(51) Int. Cl.
*B01D 53/22* (2006.01)
*B01D 63/10* (2006.01)
(Continued)

(52) U.S. Cl.
CPC ............. *B01D 53/22* (2013.01); *B01D 63/10* (2013.01); *B01D 69/00* (2013.01); *B01D 69/10* (2013.01);
(Continued)

(58) Field of Classification Search
CPC ........ B01D 53/22; B01D 63/10; B01D 69/10; B01D 69/12; B01D 69/125; B01D 71/02;
(Continued)

(56) References Cited

U.S. PATENT DOCUMENTS

| | | |
|---|---|---|
| 2005/0159571 A1 | 7/2005 | Hamamoto et al. |
| 2011/0036237 A1 | 2/2011 | Okada et al. |

(Continued)

FOREIGN PATENT DOCUMENTS

| | | |
|---|---|---|
| CN | 102196894 A | 9/2011 |
| CN | 102458625 A | 5/2012 |

(Continued)

OTHER PUBLICATIONS

International Search Report for PCT/JP2017/013211 dated Jun. 20, 2017 [PCT/ISA/210].

(Continued)

*Primary Examiner* — Jason M Greene
(74) *Attorney, Agent, or Firm* — Sughrue Mion, PLLC

(57) ABSTRACT

Provided is an acid gas separation membrane that includes an acid gas separation layer containing a hydrophilic resin and an acid gas carrier, a hydrophobic porous membrane layer supporting the acid gas separation layer, a porous membrane protective layer protecting the acid gas separation layer, and a first layer having a Gurley number of less than or equal to 0.5 times a Gurley number of the hydrophobic porous membrane layer and the porous membrane protective layer, the Gurley number of the first layer being greater than or equal to 0.1 s and less than or equal to 30 s. Also provided is an acid gas separation method using the acid gas separation membrane, as well as an acid gas separation module and an acid gas separation apparatus that each include the acid gas separation membrane.

11 Claims, 5 Drawing Sheets

(51) Int. Cl.
| | |
|---|---|
| *B01D 69/10* | (2006.01) |
| *B01D 69/12* | (2006.01) |
| *B01D 71/32* | (2006.01) |
| *B01D 71/52* | (2006.01) |
| *B01D 71/64* | (2006.01) |
| *B01D 71/68* | (2006.01) |
| *B01D 71/02* | (2006.01) |
| *B01D 71/66* | (2006.01) |
| *B01D 69/00* | (2006.01) |
| *B01D 71/04* | (2006.01) |

(52) U.S. Cl.
CPC .............. *B01D 69/12* (2013.01); *B01D 71/02* (2013.01); *B01D 71/022* (2013.01); *B01D 71/04* (2013.01); *B01D 71/32* (2013.01); *B01D 71/52* (2013.01); *B01D 71/64* (2013.01); *B01D 71/66* (2013.01); *B01D 71/68* (2013.01); B01D 2257/304 (2013.01); B01D 2257/504 (2013.01); B01D 2258/0208 (2013.01); B01D 2311/04 (2013.01); B01D 2325/02 (2013.01); B01D 2325/38 (2013.01)

(58) Field of Classification Search
CPC ...... B01D 71/022; B01D 71/04; B01D 71/32; B01D 71/52; B01D 71/64; B01D 71/66; B01D 71/68; B01D 2257/304; B01D 2257/504; B01D 2325/38
See application file for complete search history.

(56) References Cited

U.S. PATENT DOCUMENTS

| | | | |
|---|---|---|---|
| 2011/0192283 A1 | 8/2011 | Shimatani et al. | |
| 2012/0061045 A1* | 3/2012 | Huizing | B01D 69/10 165/10 |
| 2014/0352540 A1 | 12/2014 | Okada et al. | |
| 2015/0151243 A1 | 6/2015 | Okada et al. | |
| 2015/0151244 A1 | 6/2015 | Ishizuka | |
| 2015/0165384 A1* | 6/2015 | Aburaya | B01D 69/10 96/12 |
| 2017/0203559 A1* | 7/2017 | Noguchi | B01D 69/12 |
| 2017/0232398 A1 | 8/2017 | Ota et al. | |
| 2018/0133654 A1 | 5/2018 | Kodama et al. | |
| 2018/0178166 A1 | 6/2018 | Okubo et al. | |
| 2018/0280892 A1* | 10/2018 | Harada | B01D 53/228 |

FOREIGN PATENT DOCUMENTS

| | | |
|---|---|---|
| CN | 104619402 A | 5/2015 |
| EP | 2 910 581 A1 | 8/2015 |
| JP | 7-088171 A | 4/1995 |
| JP | 07-112122 A | 5/1995 |
| JP | 7-102310 B2 | 11/1995 |
| JP | 8-193156 A | 7/1996 |
| JP | 2879057 B2 | 4/1999 |
| JP | 2003-268009 A | 9/2003 |
| JP | 2008-036463 A | 2/2008 |
| JP | 2008036464 A | 2/2008 |
| JP | 2009195900 A | 9/2009 |
| JP | 2010-240622 A | 10/2010 |
| JP | 2012-205971 A | 10/2012 |
| JP | 2013-049048 A | 3/2013 |
| JP | 2014-065025 A | 4/2014 |
| JP | 2014079751 A | 5/2014 |
| JP | 5598630 B1 | 10/2014 |
| JP | 2015-112502 A | 6/2015 |
| JP | 2015-167875 A | 9/2015 |
| TW | 201408362 A | 3/2014 |
| TW | 201609239 A | 3/2016 |
| WO | 2009093666 A1 | 7/2009 |
| WO | 2016194832 A1 | 12/2016 |
| WO | 2016194833 A1 | 12/2016 |

OTHER PUBLICATIONS

Communication dated Nov. 8, 2019 from European Patent Office in counterpart EP Application No. 17779035.9.
Communication dated Jun. 30, 2020 from Taiwanese Patent Office in TW Application No. 106111079.
Communication dated Sep. 4, 2020 from the China National Intellectual Property Administration in Application No. 201780021737.3.
Communication dated Feb. 24, 2021 from the Japanese Patent Office in application No. 2018-510564.

* cited by examiner

ACID GAS SEPARATION MEMBRANE AND ACID GAS SEPARATION METHOD USING SAME, ACID GAS SEPARATION MODULE, AND ACID GAS SEPARATION APPARATUS

CROSS REFERENCE TO RELATED APPLICATIONS

This application is a National Stage of International Application No. PCT/JP2017/013211 filed Mar. 30, 2017, claiming priority based on Japanese Patent Application No. 2016-074913 filed Apr. 4, 2016.

TECHNICAL FIELD

The present invention relates to, for example, an acid gas separation membrane excellent in acid gas permeability and capable of selectively suppressing permeation of water vapor.

BACKGROUND ART

Steam reforming is means for feeding hydrogen to a fuel cell. The steam reforming causes a reaction between a hydrocarbon and water vapor to give carbon monoxide and hydrogen and further causes a reaction between carbon monoxide and water vapor to generate carbon dioxide and hydrogen. Then, hydrogen is obtained by separating carbon dioxide from the generated gaseous mixture containing carbon dioxide and hydrogen.

As a method of separating carbon dioxide from the gaseous mixture, a membrane separation method is recently drawing attention because energy saving is expected by the method. As a gas separation membrane used in the membrane separation method, various separation membranes have been proposed so far. For example, Japanese Patent Laying-Open No. H08-193156 (PTL 1) proposes a carbon dioxide separation film formed of a resin composition containing a reaction mixture of polyacrylic acid with a predetermined equivalent of an aliphatic amine. Japanese Patent Laying-Open No. 2013-49048 (PTL 2) proposes a carbon dioxide facilitated transport membrane in which a heat-resistant porous membrane supports a gel layer including a hydrogel membrane containing glycine and a deprotonation agent. Japanese Patent Laying-Open No. H07-112122 (PTL 3) proposes a carbon dioxide separation gel membrane characterized in that an aqueous solution of a non-cross-linked vinyl alcohol-acrylic acid salt copolymer is filmily applied onto a carbon dioxide permeable support body, the resultant product is heated for cross-linking to make the product water-insoluble, and the water-insoluble product is allowed to absorb an aqueous solution containing a substance having affinity for carbon dioxide for gelation.

CITATION LIST

Patent Literature

PTL 1: Japanese Patent Laying-Open No. H08-193156
PTL 2: Japanese Patent Laying-Open No. 2013-49048
PTL 3: Japanese Patent Laying-Open No. H07-112122

SUMMARY OF INVENTION

Technical Problem

Maximum use of heat energy of process gas is essential to achieve energy saving. Heat energy that has become excess during a process is recovered by a heat exchanger using a medium such as steam and the recovered heat energy is used in another process.

When process gas contains water vapor, it is desirable to recover not only sensible heat of the process gas but also latent heat of the water vapor. When heat energy is recovered from process gas, the higher the dew point of water vapor contained in the process gas is, the more easily the recovery of heat energy is performed.

When heat energy is recovered in a process including a membrane separation method, a heart energy recovery step is normally provided after a membrane separation step because a general membrane has better permeation performance at higher temperature. A heat energy recovery target is preferably residual process gas having a specific component separated therefrom through membrane separation and having high pressure.

However, in a membrane separation method that separates acid gas from a gaseous mixture containing the acid gas and water vapor through permeation, using a facilitated transport membrane containing a hydrophilic resin, the water vapor having a large heat capacity permeates through the membrane toward the membrane's permeate side low in pressure, lowering the dew point of residual process gas high in pressure to make recovery of heat energy difficult.

The present invention has been made in view of such a conventional problem, and an object of the present invention is to provide an acid gas separation membrane excellent in acid gas permeability and capable of suppressing permeation of water vapor.

Another object of the present invention is to provide a module having an excellent acid gas separation property.

Still another object of the present invention is to provide an acid gas separation apparatus that is capable of selectively separating acid gas, suppresses discharge of water vapor from a membrane's permeate side, and is capable of highly efficiently recovering heat energy of residual process gas after a membrane separation step.

Solution to Problem

The present invention provides an acid gas separation membrane, an acid gas separation method, an acid gas separation module, and an acid gas separation apparatus that are described below.

[1] An acid gas separation membrane including:
an acid gas separation layer containing a hydrophilic resin and an acid gas carrier;
a hydrophobic porous membrane layer supporting the acid gas separation layer;
a porous membrane protective layer protecting the acid gas separation layer; and
a first layer having a Gurley number of less than or equal to 0.5 times a Gurley number of the hydrophobic porous membrane layer and the porous membrane protective layer, the Gurley number of the first layer being greater than or equal to 0.1 s and less than or equal to 30 s.

[2] The acid gas separation membrane according to [1], in which the first layer includes at least one porous body.

[3] The acid gas separation membrane according to [2], in which the porous body included in the first layer is at least one selected from the group consisting of a porous membrane, a net, a woven fabric, and a non-woven fabric.

[4] The acid gas separation membrane according to [2] or [3], in which a material for the porous body included in the first layer is at least one selected from the group consisting of a fluororesin, polyphenylene sulfide, polyethersulfone, polyetheretherketone, a polyimide, metal, glass, and ceramics.

[5] The acid gas separation membrane according to any of [1] to [4], in which the first layer is stacked on a gas-component-feed side of the acid gas separation layer.

[6] The acid gas separation membrane according to any of [1] to [5], in which a gas-component-feed side surface of the first layer is subjected to water-repellent treatment.

[7] The acid gas separation membrane according to any of [1] to [6], in which the first layer has an average layer thickness in a range of greater than or equal to 5 μm and less than or equal to 500 μm.

[8] The acid gas separation membrane according to any of [1] to [7], in which materials for the hydrophobic porous membrane layer and the porous membrane protective layer are at least one selected from the group consisting of a fluororesin, polyphenylene sulfide, polyethersulfone, polyetheretherketone, and a polyimide.

[9] The acid gas separation membrane according to any of [1] to [8], in which the hydrophobic porous membrane layer has an average pore size in a range of greater than or equal to 0.005 μm and less than or equal to 10 μm.

[10] An acid gas separation method including:
feeding a gaseous mixture containing acid gas and water vapor toward one surface of the acid gas separation membrane according to any of [1] to [9]; and
separating the acid gas in the gaseous mixture through another surface of the acid gas separation membrane.

[11] An acid gas separation module including the acid gas separation membrane according to any of [1] to [9].

[12] An acid gas separation module including a spiral-type acid gas separation element,
the spiral-type acid gas separation element including a hollow gas collection tube that has a plurality of holes formed on a wall surface of the hollow gas collection tube, and a stacked body wound around an outer periphery of the hollow gas collection tube,
the stacked body including the acid gas separation membrane according to any of [1] to [9], a feed-side flow channel member that forms a flow channel for a gaseous component to be fed, and a permeate-side flow channel member that forms a flow channel for a gaseous component that has permeated through the acid gas separation membrane.

[13] An acid gas separation apparatus including:
the acid gas separation module according to [11] or [12]; and
a gas feed part for feeding a gaseous mixture containing acid gas and water vapor to the acid gas separation module.

Advantageous Effects of Invention

An acid gas separation membrane according to the present invention is capable of giving excellent acid gas permeability and suppressing permeation of water vapor.

An acid gas separation method and an acid gas separation module according to the present invention are capable of selectively and highly efficiently separating acid gas from a gaseous mixture containing the acid gas and water vapor.

DESCRIPTION OF EMBODIMENTS

Figure 1:
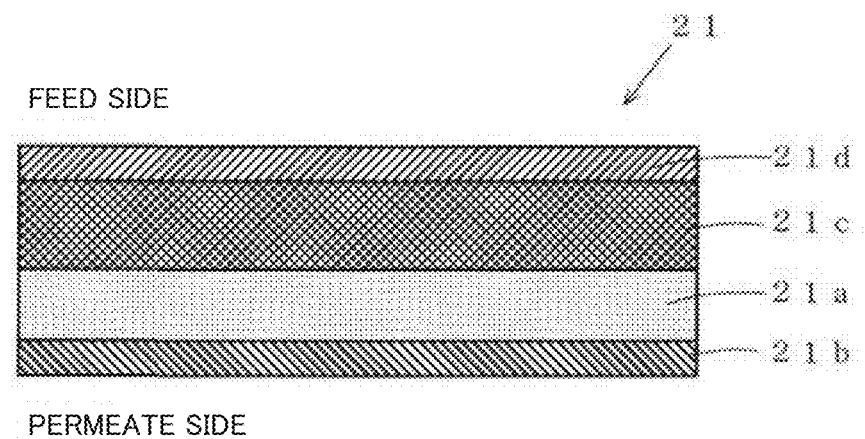
FIG. 1 is a sectional view illustrating one exemplified acid gas separation membrane according to the present invention.

An acid gas separation membrane according to the present invention includes an acid gas separation layer containing a hydrophilic resin and an acid gas carrier, a hydrophobic porous membrane layer supporting the acid gas separation layer, a porous membrane protective layer protecting the acid gas separation layer, and a first layer having a Gurley number of less than or equal to 0.5 times a Gurley number of the hydrophobic porous membrane layer and the porous membrane protective layer. The Gurley number of the first layer is greater than or equal to 0.1 s and less than or equal to 30 s. Hereinafter, described is each of the acid gas separation layer, the hydrophobic porous membrane layer, the porous membrane protective layer, and the first layer that constitute the acid gas separation membrane according to the present invention.

In the present application, the acid gas refers to gas that exhibits acidity, such as carbon dioxide and hydrogen sulfide. In the following specific description, the acid gas is occasionally described with carbon dioxide ($CO_2$) taken as one example.

(Acid Gas Separation Layer)

The acid gas separation layer realizes high permeation selectivity for specific gas by, in addition to a solution-diffusion mechanism based on the difference in solubility and in diffusivity of gas molecules in the layer, a facilitated transport mechanism for facilitating, using a substance called an acid gas carrier that reversibly reacts with acid gas, permeation of the specific gas as a reaction product with the acid gas carrier. The following formula (1) represents a reaction between carbon dioxide and a carbon dioxide carrier, with carbon dioxide used as the acid gas and cesium carbonate ($Cs_2CO_3$) as the acid gas carrier (carbon dioxide carrier). The sign "⇌" in the reaction formula in the present specification represents a reversible reaction.

$$CO_2 + Cs_2CO_3 + H_2O \Leftrightarrow 2CsHCO_3 \tag{1}$$

The reversible reaction between carbon dioxide and the carbon dioxide carrier that is represented by the formula (1) requires water, so that the hydrophilic resin contained in the acid gas separation layer is preferably a resin having a hydrophilic group such as a hydroxy group or an ion exchange group, more preferably a cross-linked hydrophilic resin whose molecular chains are cross-linked to one another to provide a mesh structure and that thus exhibits a high water retention property. In addition, large pressure is applied as a driving force for gas to permeate the acid gas separation membrane, so that the hydrophilic resin constituting the acid gas separation layer preferably includes a cross-linked hydrophilic resin, also from the viewpoint of ensuring pressure strength required for the acid gas separation membrane.

The hydrophilic resin contained in the acid gas separation layer preferably has a structural unit derived from, for example, alkyl acrylate ester, alkyl methacrylate ester, fatty acid vinyl ester, or a derivative of any of these substances. Examples of such a hydrophilic polymer include polymers obtained by polymerizing monomers such as acrylic acid, itaconic acid, crotonic acid, methacrylic acid, and vinyl acetate. Specific examples thereof include polyacrylic acid, polyitaconic acid, polycrotonic acid, a polymethacrylic acid, and the like each having a carboxyl group as an ion exchange group, polyvinyl alcohol and the like having a hydroxy group; and copolymers of these substances such as an acrylic acid-vinyl alcohol copolymer, an acrylic acid-methacrylic acid copolymer, an acrylic acid-methyl methacrylate copolymer, and a methacrylic acid-methyl methacrylate copolymer. Among these, more preferable are polyacrylic acid as a polymer of acrylic acid, polymethacrylic acid as a polymer of methacrylic acid, polyvinyl alcohol obtained by hydrolyzing a polymer of vinyl acetate, an acrylic acid salt-vinyl alcohol copolymer obtained by saponifying a copolymer of methyl acrylate and vinyl acetate, and an acrylic acid-methacrylic acid copolymer as a copolymer of acrylic acid and methacrylic acid. A polyacrylic acid and an acrylic acid salt-vinyl alcohol copolymer are further preferable.

The cross-linked hydrophilic resin may be prepared by reacting the hydrophilic resin with a cross-linking agent or by copolymerizing a monomer to be a raw material for the hydrophilic resin with a cross-linkable monomer. The cross-linking agent or the cross-linkable monomer is not particularly limited, and it is possible to use a conventionally publicly known cross-linking agent or cross-linkable monomer.

Examples of the cross-linking agent include conventionally publicly known cross-linking agents such as an epoxy cross-linking agent, polyvalent glycidyl ether, a polyhydric alcohol, a polyvalent isocyanate, a polyvalent aziridine, a haloepoxy compound, a polyvalent aldehyde, a polyvalent amine, an organometallic cross-linking agent, and a metallic cross-linking agent. Examples of the cross-linkable monomer include conventionally publicly known cross-linkable monomers such as divinylbenzene, N,N'-methylenebisacrylamide, trimethylolpropane triallyl ether, and pentaerythritol tetraallyl ether. As a cross-linking method, it is possible to use conventionally publicly known techniques such as thermal cross-linking, ultraviolet cross-linking, electron beam cross-linking, radiation cross-linking, and photo-cross-linking as well as methods disclosed in Japanese Patent Laying-Open Nos. 2003-268009 and H07-88171.

The acid gas separation layer may be formed of a hydrophilic resin composition obtained by mixing the cross-linked hydrophilic resin with a non-cross-linked hydrophilic resin that is not cross-linked or may be formed of a combined layer obtained by stacking a layer containing the cross-linked hydrophilic resin (cross-linked hydrophilic resin layer) and a layer containing a hydrophilic resin composition different from the cross-linked hydrophilic resin layer.

(Acid gas carrier)

The acid gas carrier may be any substance that exists in a resin layer containing the hydrophilic resin and reversibly reacts with acid gas dissolved in water of the hydrophilic resin to play a role of allowing selective permeation of the acid gas, and it is possible to use a conventionally publicly known substance.

Examples of such an acid gas carrier include alkali metal compounds such as an alkali metal carbonate, an alkali metal bicarbonate, and an alkali metal hydroxide when the acid gas is, for example, carbon dioxide (hereinafter, referred to as a "carbon dioxide carrier"). Alkali metal constituting these alkali metal compounds is preferably Na, K, Rb, or Cs. Examples of the alkali metal carbonate include sodium carbonate, potassium carbonate, rubidium carbonate, and cesium carbonate. Examples of the alkali metal bicarbonate include sodium bicarbonate, potassium bicarbonate, rubidium bicarbonate, and cesium bicarbonate. Examples of the alkali metal hydroxide include sodium hydroxide, potassium hydroxide, rubidium hydroxide, and cesium hydroxide. Among these, the carbon dioxide carrier is preferably an alkali metal carbonate or an alkali metal hydroxide each exhibiting deliquescence, more preferably cesium carbonate or cesium hydroxide each having high solubility in water.

An examples of the acid gas carrier when the acid gas is carbon dioxide also includes an alkanolamine (for example, JP Patent No. 2086581), and these acid gas carriers are also effective when the acid gas is hydrogen sulfide. Examples of the acid gas carrier when the acid gas is sulfur oxide include a sulfur-containing compound, alkali metal citrate, and a transition metal complex (for example, JP Patent No. 2879057). Examples of the acid gas carrier when the acid gas is nitrogen oxide include alkali metal nitrite and a transition metal complex (for example, JP Patent No. 2879057).

The acid gas separation layer may contain, in addition to alkali metal cations derived from the acid gas carrier, various alkali metal cations such as alkali metal cations used in a neutralization reaction of an ion exchange group (for example, a carboxyl group) in the hydrophilic resin. For example, when the acid gas is carbon dioxide and the acid gas carrier is an alkali metal compound, the content of all the alkali metal cations contained in the acid gas separation layer is preferably greater than or equal to 1 molar equivalent and less than or equal to 6 molar equivalents, more preferably greater than or equal to 1.5 molar equivalents and less than or equal to 5 molar equivalents, relative to the total 1 mole of the ion exchange group in the hydrophilic resin. The acid gas separation layer having a content of alkali metal cations of less than 1 molar equivalent may possibly deteriorate in membrane formability. On the other hand, the acid gas separation layer having a content of alkali metal cations of more than 6 molar equivalents may not possibly give carbon dioxide permeability expected.

The average layer thickness of the acid gas separation layer is appropriately selected according to permeation performance required for the acid gas separation membrane but is normally preferably greater than or equal to 10 μm and less than or equal to 300 μm, more preferably greater than or equal to 15 μm and less than or equal to 250 μm, further preferably greater than or equal to 20 μm and less than or equal to 200 μm.

(Additive)

The acid gas separation layer may further contain, for example, a hydration reaction catalyst for the acid gas or a later-described surface active agent as an additive, in addition to the hydrophilic resin and the acid gas carrier that reversibly reacts with the acid gas, both the hydrophilic resin and the acid gas carrier constituting the acid gas separation layer. The hydration reaction catalyst for the acid gas can increase the reaction rate between the acid gas and the carrier.

The hydration reaction catalyst for the acid gas is preferably a catalyst containing an oxo acid compound, more preferably a catalyst containing an oxo acid compound of at least one element selected from the group consisting of Group 14 elements, Group 15 elements, and Group 16 elements, further preferably a catalyst containing at least one selected from the group consisting of a tellurous acid compound, a selenious acid compound, an arsenious acid compound, and an orthosilicic acid compound.

(Hydrophobic Porous Membrane Layer)

The acid gas separation membrane includes a hydrophobic porous membrane layer that is less likely to be resistant to diffusion of a gas component having permeated through a membrane and is high in gas permeability. The acid gas separation layer is stacked on one surface of the hydrophobic porous membrane layer to form the acid gas separation membrane, so that it is possible to inhibit liquid moisture in the acid gas separation layer from entering into pores of the hydrophobic porous membrane layer and thus suppress a decrease in acid gas permeation performance of the acid gas separation membrane. The hydrophobic porous membrane layer may be one layer or two or more layers.

As the hydrophobic porous membrane layer used, it is possible to use any conventionally publicly known layer that supports the acid gas separation layer and allows the acid gas to permeate through itself. Examples of a material for such a hydrophobic porous membrane layer include polyolefin resins such as polyethylene and polypropylene; fluororesins such as polytetrafluoroethylene (PTFE), polyvinyl fluoride, and polyvinylidene fluoride; resin materials such as polyphenylene sulfide (PPS), polyethersulfone (PES), polyetheretherketone (PEEK), a polyimide, high-molecular-weight polyester, a polyolefin, a heat-resistant polyamide, aramid, and polycarbonate; and inorganic materials such as metal, glass, and ceramics. These materials may be used in combination of two or more materials. Among these, preferable is at least one selected from the group consisting of fluorocarbon resins, PPS, PES, PEEK, and a polyimide in terms of water repellency and heat resistance. More preferable is PTFE because, for example, it allows easy securement of a minute pore size and is capable of increasing the porosity to give good energy efficiency for separation. The "hydrophobicity" means having a water contact angle of greater than or equal to 90° at 25° C.

The hydrophobic porous membrane layer preferably has heat resistance (for example, heat resistance of greater than or equal to 100° C.) corresponding to an actual use environment. The "heat resistance corresponding to an actual use environment" means that even after the hydrophobic porous membrane layer is stored under any temperature condition of higher than a temperature of the actual use environment for 2 hours, the form of the layer before the storage is maintained without, for example, generating any visually recognizable curl caused by thermal contraction or thermal melting.

The hydrophobic porous membrane layer has an average pore size of preferably less than or equal to 20 µm, more preferably greater than or equal to 0.005 µm and less than or equal to 10 µm. The hydrophobic porous membrane layer has a porosity of preferably greater than or equal to 5% and less than or equal to 99%, more preferably greater than or equal to 30% and less than or equal to 90%. The average layer thickness of the hydrophobic porous membrane layer is not particularly limited but is normally preferably greater than or equal to 10 µm and less than or equal to 3000 µm, more preferably greater than or equal to 10 µm and less than or equal to 500 µm, further preferably greater than or equal to 15 µm and less than or equal to 150 µm from the viewpoint of mechanical strength. The average layer thickness in the present specification is an average value of the layer thickness.

When the hydrophobic porous membrane layer is a layer including two or more layers, the average layer thickness of the hydrophobic porous membrane layer is average layer thickness of the whole hydrophobic porous membrane layer including the two or more layers.

(Porous Membrane Protective Layer)

The acid gas separation membrane includes a porous membrane protective layer that is less likely to be resistant to diffusion of a gas component fed to the acid gas separation layer and is high in gas permeability. The porous membrane protective layer is stacked on a feed-side surface of the acid gas separation layer to prevent the surface of the acid gas separation layer from being scratched or a load such as pressing force from being generated on the surface when an acid gas separation module is produced that includes, for example, a later-described spiral-type acid gas separation element, so that it is possible to suppress damage to the acid gas separation layer. The porous membrane protective layer may be one layer or two or more layers.

The porous membrane protective layer may be any layer that allows permeation of at least the acid gas and water vapor. The porous membrane protective layer, however, is preferably a hydrophobic layer from the viewpoint of inhibiting the acid gas separation layer from being damaged by condensed water derived from water vapor in mixed gas fed to the acid gas separation layer. Examples of a material for the porous membrane protective layer include polyolefin resins such as polyethylene and polypropylene; fluororesins such as polytetrafluoroethylene (PTFE), polyvinyl fluoride, and polyvinylidene fluoride; and resin materials such as polyphenylene sulfide (PPS), polyethersulfone (PES), polyetheretherketone (PEEK), a polyimide, high-molecular-weight polyester, a polyolefin, a heat-resistant polyamide, aramid, and polycarbonate. These materials may be used in combination of two or more materials Among these, preferable is at least one selected from the group consisting of fluororesins, PPS, PES, PEEK, and a polyimide. The porous membrane protective layer preferably has, similarly to the hydrophobic porous membrane layer, heat resistance corresponding to an actual use environment.

The porous membrane protective layer has an average pore size of preferably less than or equal to 20 µm, more preferably greater than or equal to 0.005 µm and less than or equal to 10 µm. The porous membrane protective layer has a porosity of preferably greater than or equal to 5% and less than or equal to 99%, more preferably greater than or equal to 30% and less than or equal to 90%. The average layer thickness of the porous membrane protective layer is not particularly limited but is normally preferably greater than or equal to 10 µm and less than or equal to 1000 µm, more preferably greater than or equal to 15 µm and less than or equal to 500 µm, further preferably greater than or equal to 20 µm and less than or equal to 250 µm from the viewpoint of mechanical strength.

When the porous membrane protective layer is a layer including two or more layers, the average layer thickness of the porous membrane protective layer is average layer thickness of the whole porous membrane protective layer including the two or more layers.

(First Layer)

The first layer has a Gurley number of less than or equal to 0.5 times a Gurley number of the hydrophobic porous membrane layer and the porous membrane protective layer. The Gurley number of the first layer is greater than or equal to 0.1 s and less than or equal to 30 s. The first layer having a Gurley number of less than 0.1 s may not possibly exert a sufficient effect of suppressing permeation of water vapor. On the other hand, the first layer having a Gurley number of more than 30 s increases resistance to permeation of the acid gas together with the effect of suppressing permeation of water vapor to possibly decrease the acid gas permeation performance. The first layer has a Gurley number preferably in a range of greater than or equal to 0.2 s and less than 20 s, more preferably in a range of greater than or equal to 0.5 s and less than 20 s.

The Gurley number of the first layer and the Gurley number of the hydrophobic porous membrane layer and the porous membrane protective layer can be adjusted by, for example, a material to be used or the layer thickness.

Here, the Gurley number represents an aeration property (rate of air permeability) measured by Method B (Gurley method) in accordance with JIS L1096. Specifically, the Gurley number is a value obtained by preparing a sample having an aeration area of 642 $mm^2$ and measuring time required for aerating the sample with 300 mL of air. Adopted in the present application is an average value of results obtained by measuring 3 different locations of each of 5 samples.

The "Gurley number of the hydrophobic porous membrane layer and the porous membrane protective layer" is a value obtained by performing the method described above using, as measurement samples, stacked bodies obtained by stacking the hydrophobic porous membrane layer and the porous membrane protective layer.

When the first layer is a layer including two or more layers, the Gurley number of the first layer is a value obtained by measuring, according to the method described above, samples of the first layers including two or more layers.

The first layer is preferably stacked on a feed side of the acid gas separation layer from the viewpoint of allowing easy permeation of the acid gas and enabling more suppression of permeation of water vapor. When the first layer is stacked on the feed side of the acid gas separation layer, the first layer may be adjacent to the acid gas separation layer or may be stacked on the acid gas separation layer with another layer interposed between the acid gas separation layer and the first layer.

The first layer preferably includes at least one porous body. Examples of the porous body include at least one selected from the group consisting of a porous membrane, a net, a woven fabric, and a non-woven fabric. Among these, preferable is at least one selected from the group consisting of a porous membrane and non-woven fabric. Examples of a material for the porous body include fluororesins such as PTFE, polyvinyl fluoride, and polyvinylidene fluoride; resin materials such as PPS, PES, PEEK, a polyimide, high-molecular-weight polyester, a polyolefin, a heat-resistant polyamide, aramid, and polycarbonate, and inorganic materials such as metal, glass, and ceramics. These materials may be used in combination of two or more materials. Among these, preferable is at least one selected from the group consisting of fluorocarbon resins, PPS, PES, PEEK, a polyimide, metal, glass, and ceramics. PTFE or PPS is more preferable.

The first layer may be one layer or two or more layers. The first layer including two or more layers is capable of giving the acid gas separation membrane that is excellent in acid gas permeability and capable of more suppressing permeation of water vapor.

The first layer preferably has an average layer thickness of greater than or equal to 5 μm and less than or equal to 500 μm. The first layer having an average layer thickness of less than 5 μm may not possibly exert a sufficient effect of suppressing permeation of water vapor. On the other hand, the first layer having an average layer thickness of more than 500 μm increases resistance to permeation of the acid gas together with the effect of suppressing permeation of water vapor to possibly decrease the acid gas permeation performance. The first layer more preferably has an average layer thickness in a range of greater than or equal to 75 μm and less than or equal to 450 μm. When the first layer is a layer including two or more layers, the average layer thickness of the first layer is average layer thickness of the whole first layer including the two or more layers.

A feed-side surface of the first layer may have been subjected to water-repellent treatment in order to allow easy permeation of the acid gas and further suppress permeation of water vapor. Examples of a method of performing a water repellent treatment include application or immersion of a silicon or fluorochemical water repellent agent, and a plasma treatment. The Gurley number of the first layer can also be adjusted by changing the conditions of the water repellent treatment.

(Method of Manufacturing Acid Gas Separation Membrane)

The acid gas separation membrane according to the present invention can be manufactured by a conventionally publicly known method. For example, an acid gas separation membrane 21 having a layer structure illustrated in FIG. 1 can be manufactured as follows.

An acid gas carrier and a hydrophilic resin are dissolved in a medium to produce an acid gas separation layer coating solution. Examples of the medium to be used include protic polar media such as alcohols (e.g., methanol, ethanol, 1-propanol, and 2-propanol) and water; nonpolar media such as toluene, xylene, and hexane; and aprotic polar media such as ketones (e.g., acetone, methyl ethyl ketone, and methyl isobutyl ketone), N-methylpyrrolidone, N,N-dimethylacetamide, and N,N-dimethylformamide. As the medium, these substances can be used alone or in admixture of two or more thereof substances compatible to one another. Among these, preferable is a medium containing at least one selected from the group consisting of water and an alcohol. More preferable is a medium containing water.

The medium may contain a surface active agent. Addition of a surface active agent to the medium allows the surface active agent to localize at a surface in a coating film formed by applying the coating solution; through this localization, a thin layer is formed in an interface between an acid gas separation layer 21a and its adjacent layer to suppress pass of the acid gas carrier. This stabilizes performance of acid gas separation membrane 21. The addition of a surface active agent also inhibits the acid gas carrier from issuing out during the application of the coating solution and improves, for example, unevenness in layer thickness. The surface active agent is not particularly limited, and it is possible to use a conventionally publicly known surface active agent. Examples of the surface active agent include polyoxyethylene polyoxypropylene glycols, polyoxyethylene alkyl phenyl ethers, polyoxyethylene alkyl ethers, a fluorochemical surface active agent, and a silicone surface active agent. These surface active agents may be used singly or in combination of two or more thereof.

Then, the acid gas separation layer coating solution prepared is applied onto a hydrophobic porous membrane layer 21b. The temperature of the coating solution in the application step may be appropriately determined according to the composition or the concentration of the coating solution. The coating solution having an excessively high temperature, however, allows a large amount of the medium to evaporate, possibly changing the composition concentration or leaving an evaporation scar on the coating film, so that the coating solution preferably has a temperature in a temperature range of greater than or equal to room temperature and less than or equal to 5° C. lower than the boiling point of the medium used. For example, the acid gas separation layer coating solution containing water as the medium is preferably applied to hydrophobic porous membrane layer 21b in a temperature range of greater than or equal to 15° C. and less than or equal to 95° C.

Examples of a method of applying the acid gas separation layer coating solution onto hydrophobic porous membrane layer 21b include spin coating, bar coating, die coating, blade coating, air-knife coating, gravure coating, roll coating, spray coating, dip coating, a Comma roll method, a kiss coater method, screen printing, and inkjet printing. As the coating amount of the coating solution, the coating weight (solid weight per unit area) is preferably greater than or equal to 1 g/m$^2$ and less than or equal to 1000 g/m$^2$, more preferably greater than or equal to 5 g/m$^2$ and less than or equal to 750 g/m$^2$, further preferably greater than or equal to 10 g/m$^2$ and less than or equal to 500 g/m$^2$. The coating weight can be adjusted by controlling, for example, the rate of forming the coating film (for example, the rate of delivering hydrophobic porous membrane layer 21b), the concentration of the coating solution, or the discharge amount of the coating solution. The coating solution may be applied in a stripe shape or a dot shape.

Next, the medium is removed from the coating film formed from the acid gas separation layer coating solution. A method of removing the medium is not particularly limited, and it is possible to use a conventionally publicly known method. The method, however, is preferably a method of drying the coating film by blowing, for example, heated air to the coating film, to evaporate the medium for removal. For example, an applied product is delivered into an air-blow drying furnace adjusted to a predetermined temperature and a predetermined humidity to evaporate the medium from the coating film for removal. This forms acid gas separation layer 21a.

The drying temperature may be appropriately determined according to, for example, the medium in the coating solution. Normally, the drying temperature is preferably set to higher than the freezing point of the medium and lower than the melting point of hydrophobic porous membrane layer 21b and is suitably greater than or equal to 80° C. and less than or equal to 200° C.

Next, a porous membrane protective layer 21c and a first layer 21d are stacked in that order on acid gas separation layer 21a. As a method of fixing each of interlayers between first layer 21d and porous membrane protective layer 21c and between porous membrane protective layer 21c and acid gas separation layer 21a, it is possible to employ, for example, a method such as application of an adhesive agent or thermal fusion bonding. When porous membrane protective layer 21c is fixed to acid gas separation layer 21a, it is preferable to make use of affinity for the hydrophilic resin contained in acid gas separation layer 21a.

(Acid Gas Separation Module)

Figure 2:
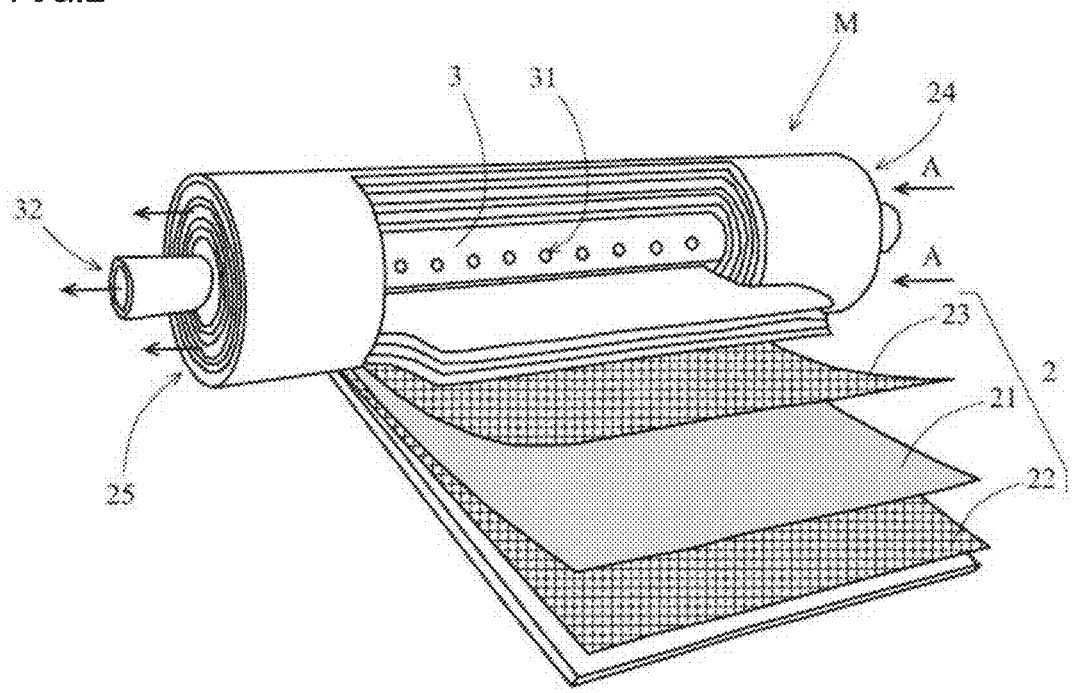
FIG. 2 is a schematic view illustrating one exemplified spiral-type acid gas separation element including the acid gas separation membrane according to the present invention, with part of the element cutaway.

An acid gas separation module including an acid gas separation membrane according to the present invention may include in a housing an acid gas separation element assembled into any of a spiral type, a cylinder type, a hollow fiber type, a pleat type, and a plate and frame type FIG. 2 is a schematic view illustrating a structure of a spiral-type acid gas separation element M including the acid gas separation membrane according to the present invention, with part of the element cutaway.

Spiral-type acid gas separation element M illustrated in FIG. 2 has a structure obtained by winding a stacked body 2 around an outer periphery of a hollow gas collection tube 3 a plurality of times, the stacked body 2 being obtained by stacking acid gas separation membrane 21, a feed-side flow channel member 22 that is a flow channel member forming a feed-side gas flow channel, and a permeate-side flow channel member 23 that is a flow channel member forming a permeate-side gas flow channel, and the gas collection tube having a plurality of holes 31 formed thereon. Feed-side flow channel member 22 and permeate-side flow channel member 23 preferably have a function of facilitating turbulent flows (front surface renewal of a membrane surface) of a gaseous mixture that is fed and contains acid gas and water vapor and of a permeation gas having permeated through acid gas separation membrane 21, to increase the rate of the acid gas in the fed fluid permeating through the membrane, and a function of minimizing a pressure drop in the feed-side gas. Feed-side flow channel member 22 and permeate-side flow channel member 23 preferably have a function as a spacer and a function of generating a turbulent flow in the gaseous mixture, so that mesh-shaped members are suitably used. The shape of a mesh changes the flow channel for the gaseous mixture, so that the shape of a unit lattice in the mesh is selected for use from shapes such as a rhombus and a parallelogram according to the purpose. Materials for feed-side flow channel member 22 and permeate-side flow channel member 23 are not particularly limited. A resin material or a metal material, however, is preferably used that has heat resistance corresponding to an actual use environment where the acid gas separation membrane according to the present invention is used.

Figure 5:
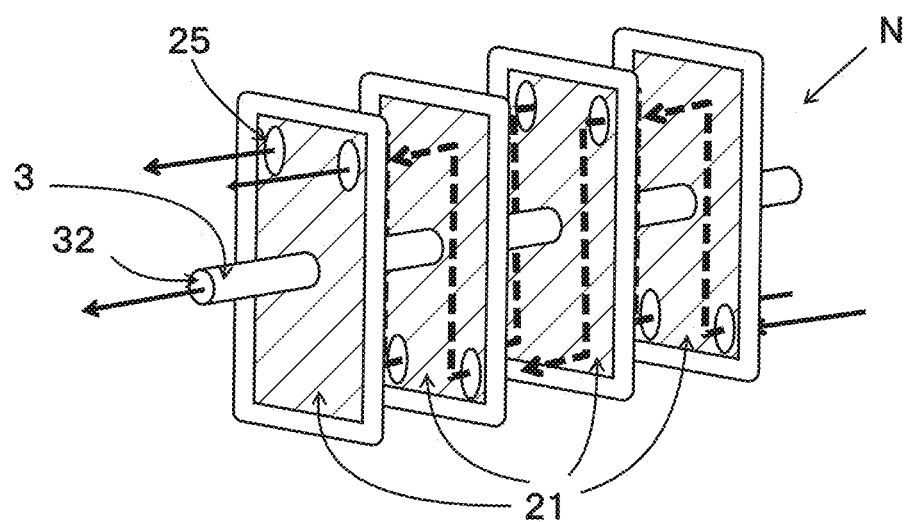
FIG. 5 is a schematic view illustrating one exemplified plate and frame-type acid gas separation element including the acid gas separation membrane according to the present invention.
Figure 6:
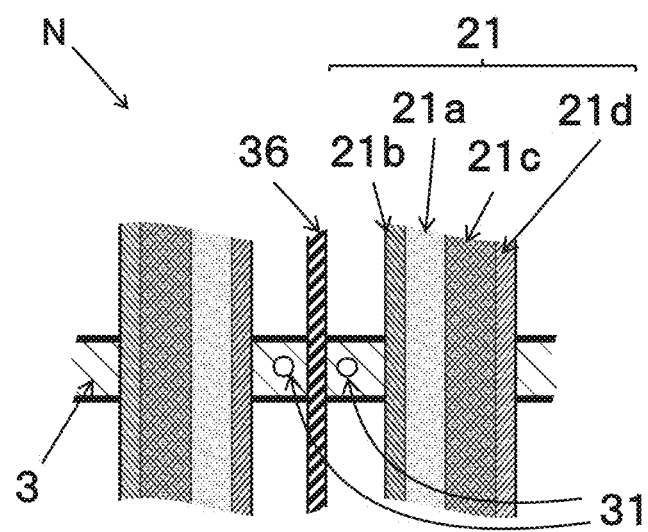
FIG. 6 is a sectional view illustrating the exemplified plate and frame-type acid gas separation element including the acid gas separation membrane according to the present invention.

FIG. 5 is a schematic view illustrating one exemplified plate and frame-type acid gas separation element including the acid gas separation membrane according to the present invention, and FIG. 6 is a sectional view illustrating the exemplified plate and frame-type acid gas separation element including the acid gas separation membrane according to the present invention.

A plate and frame-type acid gas separation element N illustrated in FIGS. 5 and 6 includes a tabular plate 36, acid gas separation membrane 21 disposed on both surfaces of the plate, and hollow gas collection tube 3 that vertically penetrates plate 36 and acid gas separation membrane 21 and has a plurality of holes 31 formed thereon (plate 36 is omitted in FIG. 5).

Permeate-side flow channel member 23 that forms a permeate-side gas flow channel may be disposed between hydrophobic porous membrane layer 21b of acid gas separation membrane 21 and plate 36.

Figure 7:
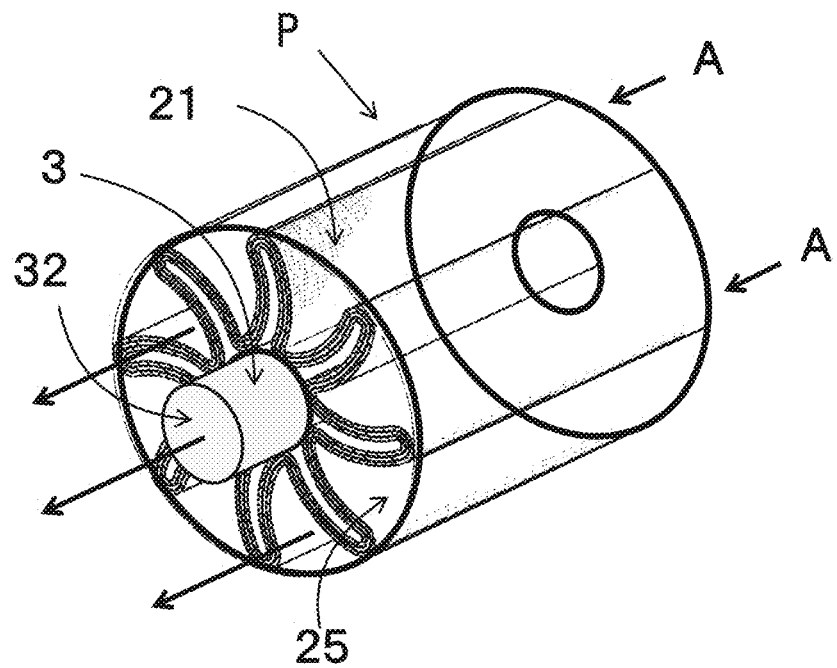
FIG. 7 is a schematic view illustrating one exemplified pleat-type acid gas separation element including the acid gas separation membrane according to the present invention.

FIG. 7 is a schematic view illustrating one exemplified pleat-type acid gas separation element including the acid gas separation membrane according to the present invention.

A pleat-type acid gas separation element P illustrated in FIG. 7 includes acid gas separation membrane 21 that is pleated and hollow gas collection tube 3, with both disposed in a cylindrical housing 38. Acid gas separation membrane 21 that is pleated is disposed on an outer periphery of gas collection tube 3.

Permeate-side flow channel member 23 that forms a permeate-side gas flow channel may be disposed on a permeate side of acid gas separation membrane 21. Feed-side flow channel member 22 that forms a feed-side gas flow channel may be disposed on a feed side of acid gas separation membrane 21

Figure 8:
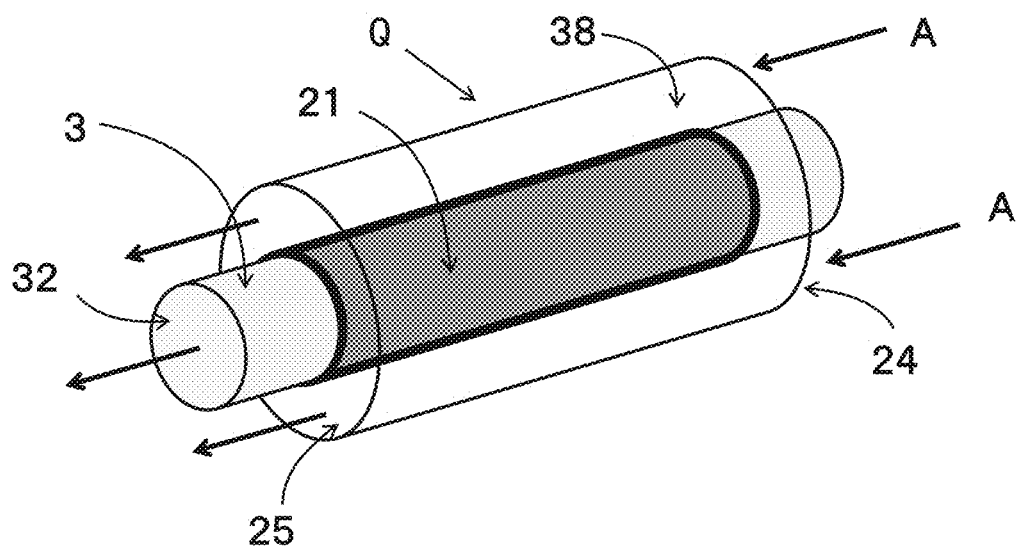
FIG. 8 is a schematic view illustrating one exemplified cylinder-type acid gas separation element including the acid gas separation membrane according to the present invention.
Figure 9:
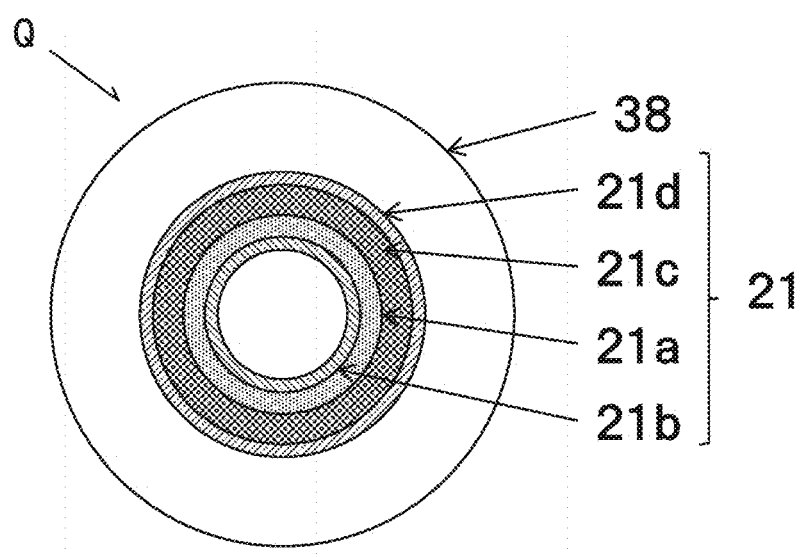
FIG. 9 is a sectional view illustrating the exemplified cylinder-type acid gas separation element including the acid gas separation membrane according to the present invention.

FIG. 8 is a schematic view illustrating one exemplified cylinder-type acid gas separation element including the acid gas separation membrane according to the present invention, and FIG. 9 is a sectional view illustrating the exemplified cylinder-type acid gas separation element including the acid gas separation membrane according to the present invention.

A cylinder-type acid gas separation element Q illustrated in FIGS. 8 and 9 includes acid gas separation membrane 21 that is cylindrical and disposed in cylindrical housing 38.

In order to form acid gas separation membrane 21 into a cylindrical shape, acid gas separation layer 21a, porous membrane protective layer 21c, and first layer 21d may be stacked on an outer surface of hydrophobic porous membrane layer 21b.

For example, as illustrated in FIG. 9, hydrophobic porous membrane layer 21b that is cylindrical may be used or hydrophobic porous membrane layer 21b may be stacked on an outer surface of a cylindrical porous body. A hollow portion inside acid gas separation membrane 21 formed into a cylindrical shape can play a similar role to gas collection tube 3 described above.

(Acid Gas Separation Method)

An acid gas separation method according to the present invention includes the steps of: feeding a gaseous mixture containing acid gas and water vapor toward one surface of the acid gas separation membrane according to the present invention; and recovering the acid gas separated from the gaseous mixture from the other surface of the acid gas separation membrane.

In spiral-type acid gas separation element M having the configuration described above, a gaseous mixture containing acid gas and water vapor is fed from a feed opening 24 of spiral-type acid gas separation element M in a direction illustrated by an arrow A, the acid gas in the gaseous mixture permeates through acid gas separation membrane 21 while the gaseous mixture flows through feed-side flow channel member 22, and the separated acid gas flows through permeate-side flow channel member 23, is collected in gas collection tube 3, and recovered from a discharge opening 32 of gas collection tube 3. On the other hand, the residual gaseous mixture that has passed through gaps of feed-side flow channel member 22 and from which the acid gas has been separated is discharged from a discharge opening 25 of spiral-type acid gas separation element M. In the meantime, sweep gas selected from, for example, inert gas may be fed to gas collection tube 3.

Also in an acid gas separation method using plate and frame-type acid gas separation element N illustrated in FIGS. 5 and 6, pleat-type acid gas separation element P, or cylinder-type acid gas separation element Q, the acid gas can be separated similarly to the method described above.

(Acid Gas Separation Apparatus)

An acid gas separation apparatus according to the present invention includes an acid gas separation module and a gas feed part for feeding a gaseous mixture containing at least acid gas and water vapor to the acid gas separation module.

The gas feed part includes a feed opening for feeding the gaseous mixture containing the acid gas and the water vapor toward one surface of an acid gas separation membrane and may be a feed opening itself of the acid gas separation module or may be a container-shaped gas feed member that houses acid gas separation element M and in which a feed-side space communicated with the feed opening of acid gas separation element M is formed. The feed opening may be formed on one surface of the acid gas separation membrane or of a stacked body including the acid gas separation membrane, or may be formed on an end surface of the acid gas separation membrane or of a stacked body including the acid gas separation membrane. For example, in spiral-type acid gas separation element M illustrated in FIG. 2, feed opening 24 may be formed on one or both end surfaces of stacked body 2 including acid gas separation membrane 21.

EXAMPLES

Hereinafter, the present invention will be described in further detail with reference to examples. The present invention, however, is not limited by these examples.

Example 1

An acid gas separation membrane was produced that had a layer structure illustrated in FIG. 1. First, 3 g of an acrylic acid-vinyl alcohol copolymer (Cs salt type) obtained by the manufacturing method disclosed in JP Patent No. 5598630 and 7 g of cesium carbonate were added to 80 g of water, stirred, and mixed to give an acid gas separation layer coating solution for forming an acid gas separation layer (preparation of a coating solution). The amount of cesium carbonate relative to the copolymer was 2.3 (g-cesium carbonate/g-copolymer). The acid gas separation layer coating solution was applied to a PTFE porous membrane (manufactured by Sumitomo Electric Fine Polymer, Inc., "POREFLON HP-010-50," thickness: 50 μm, average pore size: 0.1 μm) as hydrophobic porous membrane layer 21b to form a coating film (membrane formation step). The application amount of the coating solution was set to a coating weight of 90 g/m$^2$. Hydrophobic porous membrane layer 21b having the coating film formed thereon was half-dried at a temperature of 60° C. for greater than or equal to 5 minutes, and then a PTFE porous membrane (manufactured by Sumitomo Electric Fine Polymer, Inc., "POREFLON HP-010-50." thickness: 50 μm, average pore size: 0.1 μm) as porous membrane protective layer 21c was stacked on an exposed surface of acid gas separation layer 21a obtained. Subsequently, the acid gas separation layer was further dried at a temperature of about 120° C. for greater than or equal to 3 minutes, and then PPS non-woven fabric I (manufactured by Hirose Paper Mfg. Co., Ltd., "PS0080") as first layer 21d was stacked on a surface of porous membrane protective layer 21c to produce acid gas separation membrane 21.

Example 2

Acid gas separation membrane 21 was produced in the same manner as in Example 1 except that PPS non-woven fabric II (manufactured by Hirose Paper Mfg. Co., Ltd., "PS0080S") was used as first layer 21d in place of the PPS non-woven fabric I used in Example 1.

Example 3

Acid gas separation membrane 21 was produced in the same manner as in Example 1 except that in addition to the PPS non-woven fabric I used as first layer 21d in Example 1, another PPS non-woven fabric I was stacked on a surface of the PPS non-woven fabric I to constitute first layer 21d including two stacked layers of the PPS non-woven fabric I as porous bodies.

Example 4

Acid gas separation membrane 21 was produced in the same manner as in Example 1 except that PPS non-woven fabric I and PPS non-woven fabric II were stacked as first layer 21d in that order (PPS non-woven fabric I on a feed side) on a surface of porous membrane protective layer 21c in place of one layer of the PPS non-woven fabric I used in Example 1.

Example 5

Acid gas separation membrane 21 was produced in the same manner as in Example 4 except that PPS non-woven fabric III (manufactured by Hirose Paper Mfg. Co., Ltd., "PS0100S") was used in place of the PPS non-woven fabric II used to constitute first layer 21d in Example 4.

Example 6

An acid gas separation membrane was produced in the same manner as in Example 3 except that PPS non-woven fabric IV obtained by water-repellent treating PPS non-woven fabric I according to the following procedures was used as the PPS non-woven fabric I that was disposed on the feed side and constituted first layer 21d in Example 3. The water repellent treatment for the PPS non-woven fabric I was performed by charging water repellent agent SFcoat SFN-AF 180E (manufactured by AGC Seimi Chemical Co., Ltd.) into a 3 cm depth tray to give a depth of the agent of about 1 cm, immersing a 10 cm×10 cm sized PPS non-woven fabric piece in the agent for 1 minute, then taking the PPS non-woven fabric out of the agent, and drying the PPS non-woven fabric at room temperature (a temperature of 20° C. to 25° C., a humidity of 40% RH to 70% RH) all night and all day.

Comparative Example 1

Figure 3:
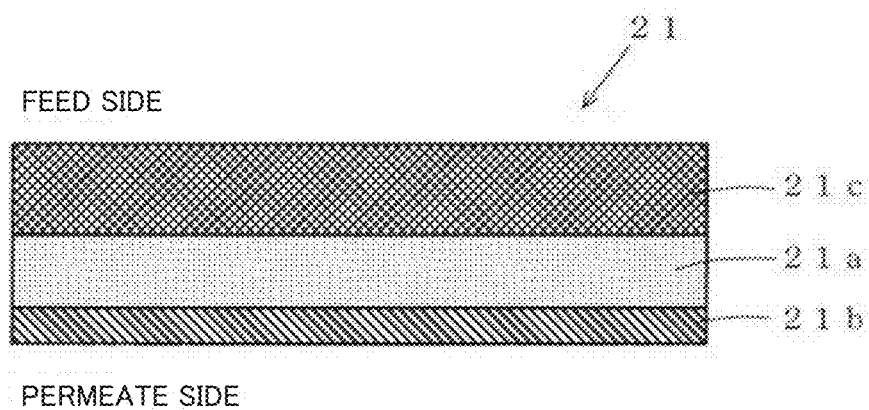
FIG. 3 is a sectional view illustrating a layer structure of an acid gas separation membrane of Comparative Example 1.

An acid gas separation membrane was produced that had a layer structure illustrated in FIG. 3. The acid gas separation membrane was produced in the same manner as in Example 1 except that first layer 21d in Example 1 was not provided.

(Measurement of Gurley Number of First Layer)

The Gurley number of only the first layer was measured using PA-301 Gurley type Densometer B (manufactured by TESTER SANGYO CO., LTD., inner cylinder: height 254 mm, inner diameter 74 mm, outer diameter 76.2 mm, mass 567 g; outer cylinder: height 254 mm, inner diameter 82.6 mm) by a method in accordance with JIS L1096. About 50 mm×50 mm sample piece was taken from 5 different locations of the first layer and fixed between a gasket and a clamping plate. Next, time required for aerating the sample with 300 mL of air (that is, Gurley number) was measured under constant pressure (inner cylinder's own weight). An average value was derived from results of the measurement performed on 3 different locations in each of the 5 sample pieces. Tables 1 and 2 summarize the results obtained.

(Measurement of Gurley Number of Hydrophobic Porous Membrane Layer and Porous Membrane Protective Layer)

The Gurley number of the hydrophobic porous membrane layer (PTFE porous membrane) and the porous membrane protective layer (PTFE porous membrane) was measured using PA-301 Gurley type Densometer B (manufactured by TESTER SANGYO CO., LTD., inner cylinder: height 254 mm, inner diameter 74 mm, outer diameter 76.2 mm, mass 567 g; outer cylinder: height 254 mm, inner diameter 82.6 mm) by a method in accordance with JIS L1096. A specific measurement method is as follows. About 50 mm×50 mm sample piece was taken from 5 different locations of a stacked body obtained by stacking the hydrophobic porous membrane layer (PTFE porous membrane) and the porous membrane protective layer (PTFE porous membrane) and fixed between a gasket and a clamping plate. Next, time required for aerating the sample with 300 mL of air (that is, Gurley number) was measured under constant pressure (inner cylinder's own weight), and an average value was derived from results of the measurement performed on 3 different locations in each of the 5 sample pieces. The average value was 120 s (Measurement of Average Pore Size of Hydrophobic Porous Membrane Layer and Porous Membrane Protective Layer)

The average pore sizes of the hydrophobic porous membrane layer and the porous membrane protective layer were measured using model CFP500AXLC from Capillary Flow Porometer by a measurement method in accordance with ASTM F316-03. The average pore sizes were measured using SilWick Silicone Fluid as a bubble solution, a porous metal disk insert having a diameter of 2.54 cm and a thickness of 3.175 mm as a bottom clamp in a sample chamber, and a hole having a diameter of 3.175 mm as an upper clamp in the sample chamber.

(Measurement of Water Vapor/Carbon Dioxide Separation Factor)

Figure 4:
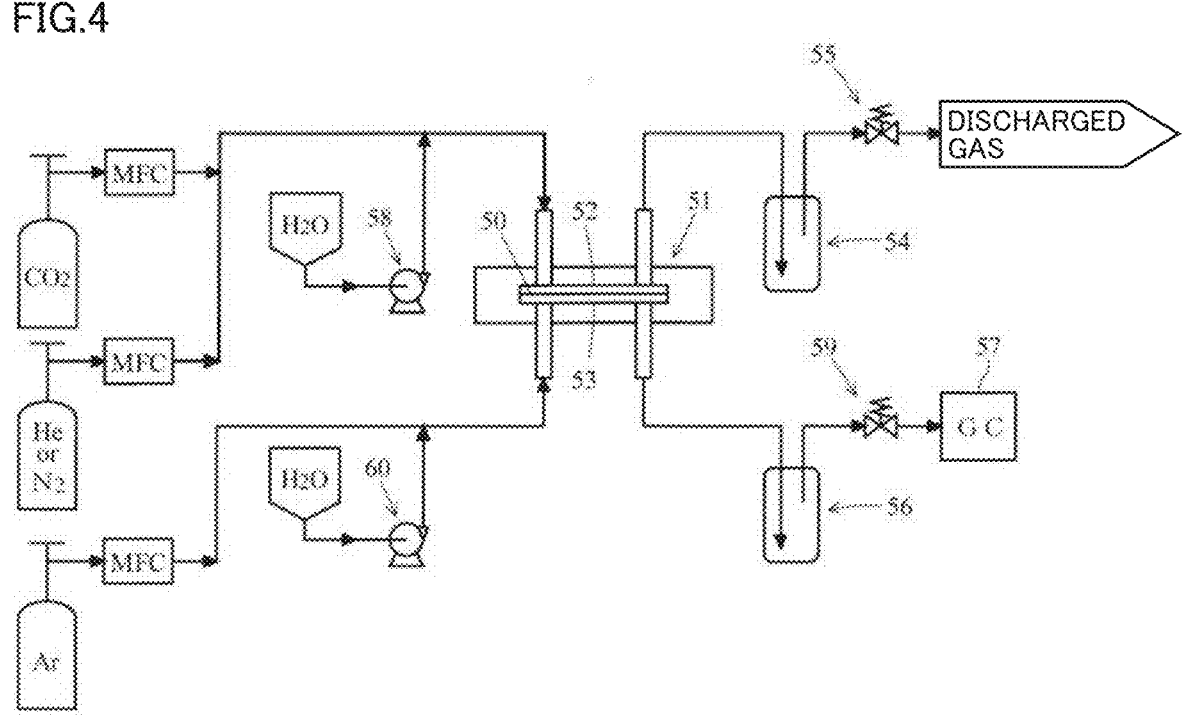
FIG. 4 is a schematic view of an acid gas separation apparatus that includes an acid gas separation module produced in examples and comparative examples.

Separation of carbon dioxide was performed using an acid gas separation apparatus including an acid gas separation module 51 illustrated in FIG. 4. Specifically, the acid gas separation membranes produced in Examples 1 to 6 and Comparative Example 1 were each cut at an appropriate size to form a flat membrane shape and fixed between a feed side 52 (corresponding to the gas feed part described above) and a permeate side 53 of acid gas separation module 51 made of stainless steel.

Raw material gas ($CO_2$: 34.4%, $N_2$ or He: 49.0%, and $H_2O$: 16.6%) was fed to feed side 52 of acid gas separation module 51 at a flow rate of $7.49 \times 10^{-2}$ mol/min, and sweep gas ($H_2O$: 100%) was fed to permeate side 53 of acid gas separation module 51. Here, $H_2O$ was adjusted to give the mixture ratio and flow rate described above by conveying water with metering feed pumps 58 and 60 and heating the water for evaporation. The pressure of feed side 52 was adjusted to 900 kPaA with a back pressure controller 55 provided midway through a discharge flow channel for gas to be discharged and downstream of a cooling trap 54. A back pressure controller 59 is provided between a cooling trap 56 and a gas chromatograph 57, and the pressure of permeate side 53 was adjusted to atmospheric pressure with the back pressure governor 59. Water vapor in sweep gas discharged from permeate side 53 was removed with cooling trap 56, and the gas flow rate after the removal was quantitated based on analysis results by gas chromatograph 57 to calculate a $H_2O/CO_2$ separation factor (that is, a $H_2O/CO_2$ permeance ratio). Tables 1 and 2 summarize the results obtained.

As shown in Table 1, any of acid gas separation membranes 21 according to the present invention in Examples 1 to 5 that included first layer 21*d* gave a lower separation factor than the separation factor of acid gas separation membrane 21 in Comparative Example 1 that included no first layer 21*d*. Accordingly, provision of first layer 21*d* on the feed side of acid gas separation layer 21*a* suppressed permeation of water vapor while allowing high $CO_2$ permeance to be maintained.

As shown in Table 2, Example 6 that included first layer 21*d* having been water-repellent treated gave a $H_2O/CO_2$ separation factor of 11 that was smaller than a separation factor of 14 given in Example 3 that included first layer 21*d* that was not water-repellent treated. That is, the water-repellent treatment for first layer 21*d* further increased the effect of suppressing permeation of water vapor while allowing high $CO_2$ permeance to be maintained.

INDUSTRIAL APPLICABILITY

An acid gas separation membrane according to the present invention is capable of giving excellent carbon dioxide permeability and suppressing permeation of water vapor and is thus useful.

REFERENCE SIGNS LIST

2: Stacked body, 3: Gas collection tube, 21: Acid gas separation membrane, 21*a*: Acid gas separation layer, 21*b*: Hydrophobic porous membrane layer. 21*c*: Porous membrane protective layer, 21*d*: First layer, 22: Feed-side flow channel member, 23: Permeate-side flow channel member, 24: Feed opening of acid gas separation element, 25: Discharge opening of acid gas separation element, 31: Hole, 32: Discharge opening of gas collection tube, 36: Plate, 38: Cylindrical housing, 50: Acid gas separation membrane, 51: Acid gas separation module, 52: Feed side of acid gas separation module, 53: Permeate side of acid gas separation module, 54, 56: Cooling trap, 55, 59: Back pressure controller, 57: Gas chromatograph, 58, 60: Metering feed pump, M: Spiral-type acid gas separation element, N: Plate and frame-type acid gas separation element, P: Pleat-type acid gas separation element, Q: Cylinder-type acid gas separation element

TABLE 1

| | First layer | | | | Porous membrane protective layer | | Hydrophobic porous membrane layer | | Permeance | | Separation factor |
|---|---|---|---|---|---|---|---|---|---|---|---|
| | Structure [—] | Material [—] | Average layer thickness [μm] | Gurley number [s] | Material [—] | Average pore size [μm] | Material [—] | Average pore size [μm] | $CO_2$ [mol/ (m² s kPa)] | $H_2O$ [mol/ (m² s kPa)] | $H_2O/CO_2$ [—] |
| Example 1 | PPS non-woven fabric I | PPS | 180 | 0.4 | PTFE | 0.1 | PTFE | 0.1 | $2.63 \times 10^{-5}$ | $6.53 \times 10^{-4}$ | 25 |
| Example 2 | PPS non-woven fabric II | PPS | 100 | 1.5 | PTFE | 0.1 | PTFE | 0.1 | $2.62 \times 10^{-5}$ | $3.42 \times 10^{-4}$ | 13 |
| Example 3 | PPS non-woven fabric I/ PPS non-woven fabric I | PPS | 360 | 0.7 | PTFE | 0.1 | PTFE | 0.1 | $2.62 \times 10^{-5}$ | $3.67 \times 10^{-4}$ | 14 |
| Example 4 | PPS non-woven fabric II/ PPS non-woven fabric I | PPS | 280 | 1.9 | PTFE | 0.1 | PTFE | 0.1 | $2.57 \times 10^{-5}$ | $2.79 \times 10^{-4}$ | 11 |
| Example 5 | PPS non-woven fabric III/ PPS non-woven fabric I | PPS | 292 | 3.0 | PTFE | 0.1 | PTFE | 0.1 | $2.58 \times 10^{-5}$ | $2.68 \times 10^{-4}$ | 10 |
| Comparative Example 1 | — | — | — | — | PTFE | 0.1 | PTFE | 0.1 | $3.06 \times 10^{-5}$ | $1.04 \times 10^{-3}$ | 34 |

TABLE 2

| | First layer | | | | Porous membrane protective layer | | Hydrophobic porous membrane layer | | Permeance | | Separation factor |
|---|---|---|---|---|---|---|---|---|---|---|---|
| | Structure [—] | Material [—] | Average layer thickness [μm] | Gurley number [s] | Material [—] | Average pore size [μm] | Material [—] | Average pore size [μm] | $CO_2$ [mol/ (m² s kPa)] | $H_2O$ [mol/ (m² s kPa)] | $H_2O/CO_2$ [—] |
| Example 3 | PPS non-woven fabric I/PPS non-woven fabric I | PPS | 360 | 0.7 | PTFE | 0.1 | PTFE | 0.1 | $2.62 \times 10^{-5}$ | $3.67 \times 10^{-4}$ | 14 |
| Example 6 | PPS non-woven fabric IV/PPS non-woven fabric I | PPS | 360 | 0.7 | PTFE | 0.1 | PTFE | 0.1 | $2.62 \times 10^{-5}$ | $2.92 \times 10^{-4}$ | 11 |

The invention claimed is:

1. An acid gas separation membrane comprising:
an acid gas separation layer containing a hydrophilic resin and an acid gas carrier;
a hydrophobic porous membrane layer supporting the acid gas separation layer;
a porous membrane protective layer protecting the acid gas separation layer; and
a first layer having a Gurley number of less than or equal to 0.5 times a Gurley number of the hydrophobic porous membrane layer and the porous membrane protective layer, the Gurley number of the first layer being greater than or equal to 0.1 s and less than or equal to 30 s,
wherein the first layer includes at least one porous body and the porous body included in the first layer is a non-woven fabric.

2. The acid gas separation membrane according to claim 1, wherein a material for the porous body included in the first layer is at least one selected from the group consisting of a fluororesin, polyphenylene sulfide, polyethersulfone, polyetheretherketone, a polyimide, metal, glass, and ceramics.

3. The acid gas separation membrane according to claim 1, wherein the first layer is stacked on a gas-component-feed side of the acid gas separation layer.

4. The acid gas separation membrane according to claim 1, wherein a gas-component-feed side surface of the first layer is subjected to water-repellent treatment.

5. The acid gas separation membrane according to claim 1, wherein the first layer has an average layer thickness in a range of greater than or equal to 5 µm and less than or equal to 500 µm.

6. The acid gas separation membrane according to claim 1, wherein materials for the hydrophobic porous membrane layer and the porous membrane protective layer are at least one selected from the group consisting of a fluororesin, polyphenylene sulfide, polyethersulfone, polyetheretherketone, and a polyimide.

7. The acid gas separation membrane according to claim 1, wherein the hydrophobic porous membrane layer has an average pore size in a range of greater than or equal to 0.005 µm and less than or equal to 10 µm.

8. An acid gas separation method comprising:
feeding a gaseous mixture containing acid gas and water vapor toward one surface of the acid gas separation membrane according to claim 1; and
separating the acid gas in the gaseous mixture through another surface of the acid gas separation membrane.

9. An acid gas separation module comprising the acid gas separation membrane according to claim 1.

10. An acid gas separation module comprising a spiral-type acid gas separation element,
the spiral-type acid gas separation element including a hollow gas collection tube that has a plurality of holes formed on a wall surface of the hollow gas collection tube, and a stacked body wound around an outer periphery of the hollow gas collection tube,
the stacked body including the acid gas separation membrane according to claim 1, a feed-side flow channel member that forms a flow channel for a gaseous component to be fed, and a permeate-side flow channel member that forms a flow channel for a gaseous component that has permeated through the acid gas separation membrane.

11. An acid gas separation apparatus comprising:
the acid gas separation module according to claim 9; and
a gas feed part for feeding a gaseous mixture containing acid gas and water vapor to the acid gas separation module.

* * * * *